United States Patent [19]
Hellwig

[11] Patent Number: 6,158,723
[45] Date of Patent: Dec. 12, 2000

[54] STABILIZER FOR LEAF SPRING SUSPENSION DEVICE

[75] Inventor: Donald J. Hellwig, Cayucos, Calif.

[73] Assignee: Hellwig Products Company, Inc., Visalia, Calif.

[21] Appl. No.: 09/206,269

[22] Filed: Dec. 4, 1998

[51] Int. Cl.[7] .................................................. B60G 11/02
[52] U.S. Cl. ................................. 267/52; 267/45; 267/48
[58] Field of Search .............................. 267/36.1, 45, 48, 267/52, 66, 158, 192, 193, 229, 230, 283

[56] References Cited

U.S. PATENT DOCUMENTS

| | | | |
|---|---|---|---|
| 3,591,163 | 7/1971 | Anderson | 267/52 |
| 3,604,676 | 9/1971 | Weber | 248/68 |
| 4,282,945 | 8/1981 | Bessey | 267/52 |

*Primary Examiner*—Michael Mar
*Assistant Examiner*—Mariano Sy
*Attorney, Agent, or Firm*—Oppenheimer Wolff & Donnelly LLP

[57] ABSTRACT

A load assistance device for increasing a vehicle's ability to carry loads by stabilizing a multi-leaf vehicle spring connected to the axle of the vehicle including a unitary length of metallic spring material adapted to be connected directly to the multiple-leaf type vehicle spring at opposite ends thereof forwardly and rearwardly of the axle connection. The length of spring material has a raised area at generally the midpoint thereof spaced from the uppermost leaf of the vehicle spring when mounted thereto and a plurality of springs of varying lengths mounted between the unitary length of spring material and the vehicle spring configured similarly thereto. The plurality of springs also have a raised area conforming to the raised area of the length of spring material forming space between the uppermost leaf of the vehicle spring and the lowermost one of the plurality of springs when coupled to the vehicle spring. A bracket is mounted on top of the unitary length of spring material at generally the center thereof spanning the raised area thereof and generally conforming to the configuration of the unitary length of spring material at its raised area. U-bolts having an offset upper portion are used to secure the load assistance device to the vehicle's preexisting multi-leaf spring.

21 Claims, 2 Drawing Sheets

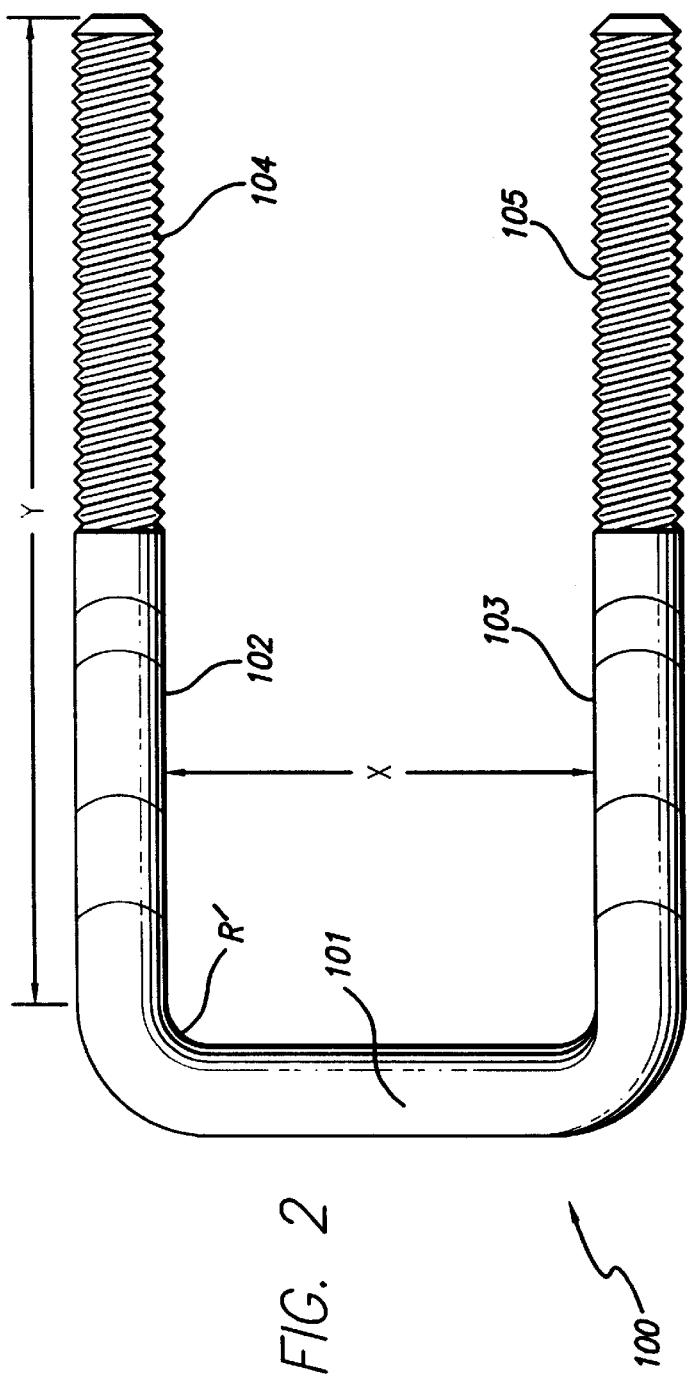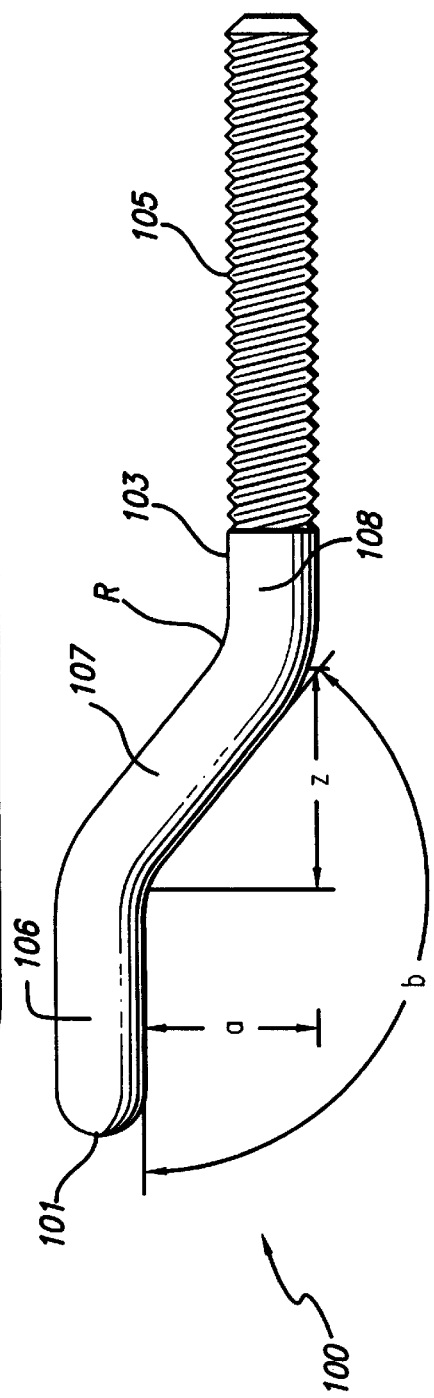

STABILIZER FOR LEAF SPRING SUSPENSION DEVICE

BACKGROUND OF THE INVENTION

The present invention relates generally to vehicle spring suspensions and more particularly to a U-bolt for a leaf spring suspension device.

It is the usual practice to isolate the rear axle of a vehicle from the frame of the vehicle by supporting the axle in a multi-leaf type spring which is suspended between a forward bearing bracket and a rearward spring shackle whereby most imperfections in the road surface can be absorbed by the wheel and the spring construction and not be transmitted to the vehicle passenger compartment through the frame. The multi-leaf type of spring is characterized by a plurality of stacked leaves, usually four or five in number, which decrease in length away from the base or mounting leaf in the form of a truncated triangular configuration. The axle suspension connects to the thickest or highest part of the multi-leaf spring to achieve maximum support.

In my U.S. application Ser. No. 09/083,752, filed May 22, 1998, now U.S. Pat. No. 5,992,831, issued Nov. 30, 1999, I disclose a stabilizer for a leaf spring suspension device. U-bolts are used to secure the stabilizing members to the preexisting vehicle multi-leaf spring member suspension device. Keepers are used on such leaf spring suspension devices to hold the leaves of the multi-leaf spring member. Such U-bolts must not interfere with the keepers holding the multi-leaves together.

There is thus a need for a U-bolt which can be used to hold a stabilizing spring to the preexisting multi-leaf spring member suspension system of a vehicle without interfering with the keepers retaining the multi-leaves of the multi-leaf spring suspension together.

SUMMARY OF THE INVENTION

It is an object of this invention to provide a load assistance stabilizer for a leaf spring suspension device that can be quickly and easily mounted to the preexisting leaf spring suspension of a vehicle.

It is a further object of this invention to provide such a stabilizer leaf spring suspension device which has a relatively low number of parts.

It is still further an object of this invention to provide a kit for carrying out the foregoing objects.

It is another object of this invention to provide a soft controlled ride when a vehicle is not loaded and is provided with the suspension device of the invention.

It is a further object of this invention to provide such a suspension device which progressively reacts to increasing loads on the vehicle by engaging the rolling arch main leaf. That is, as the load increases, the spring rate of the compound bent main leaf increases.

It is still another object of this invention to provide a U-bolt for securing the stabilizer to the multi-leaf spring suspension system without interfering with keepers retaining the leaves of the multi-leaf spring together.

These and other objects are preferably accomplished by providing a load assistance device for increasing a vehicle's ability to carry loads by stabilizing a multi-leaf type vehicle spring connected to the axle of the vehicle including a unitary length of metallic spring material adapted to be connected directly to the multi-leaf type vehicle spring at opposite ends thereof forwardly and rearwardly of the axle connection. The length of spring material has a raised area at generally the midpoint thereof spaced from the uppermost leaf of the vehicle spring when mounted thereto and a plurality of springs of varying lengths mounted between the unitary length of spring material and the vehicle spring and configured similarly thereto. The plurality of springs also have a raised area conforming to the raised area of the length of spring material forming a space between the uppermost leaf of the vehicle spring and the lowermost one of the plurality of springs when coupled to the vehicle spring.

A bracket is mounted on top of the unitary length of spring material at generally the center thereof spanning the raised area thereof and generally conforming to the configuration of the unitary length of spring material at its raised area. A pair of spaced U-shaped brackets encircle the bracket, the unitary length of spring material, and the plurality of springs and are adapted to secure the unitary length of spring material and the plurality of springs to the multi-leaf type vehicle spring. U-bolts having an offset upper portion are used to secure the load assistance device to the vehicle's preexisting multi-leaf spring.

BRIEF DESCRIPTION OF THE DRAWINGS

FIG. 2 is a top plan view of one of the U-bolts alone in accordance with the teaching of the invention; and FIG. 3 is a view taken along lines 3—3 of FIG. 2.

DESCRIPTION OF THE PREFERRED EMBODIMENT

Figure 1:
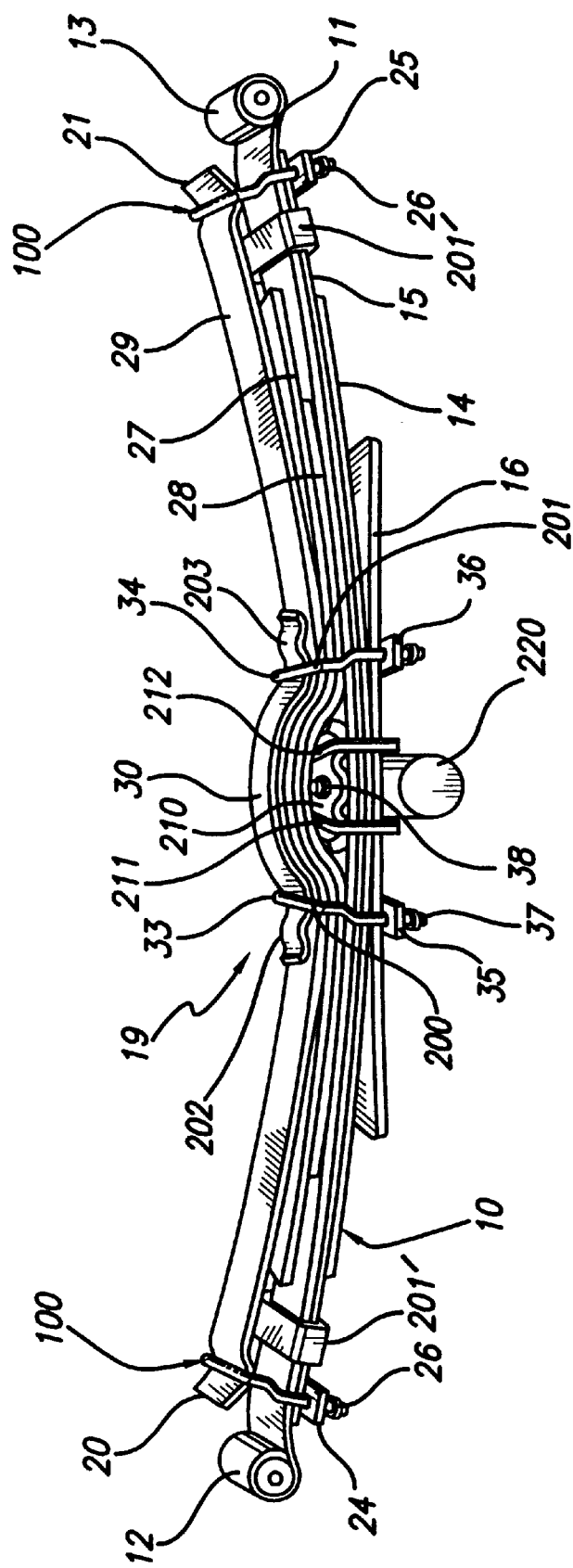
FIG. 1 is a perspective view of a load assistance device secured to conventional multi-leaf type spring using U-bolts in accordance with the teachings of the invention.

Referring now to FIG. 1 of the drawing, a conventional multi-leaf spring 10 is shown elongated spring member 11 fixed to the vehicle frame (not shown) by means of coiled ends 12, 13 (FIG. 1) coupled to suitable brackets (not shown) on the vehicle frame. Leaf spring 10, as is well known in the art, is comprised of varying lengths of spring members, as spring members 14, 15, 16 which are secured to spring member 11 by suitable U-shaped bolts 100 which are secured to the vehicle rear axle as is well known in the art. The varying lengths 14, 15, 16 may be secured together at generally the middle thereof by a nut and bolt combination 38.

As discussed in my co-pending application Ser. No. 09/083,752 now U.S. Pat. No. 5,992,831, issued Nov. 30, 1999, the teachings of which are incorporated herein by reference, load assistance device 19 is mounted to the preexisting multi-leaf spring 10. Load assistance device 19 includes a spring 29 in the form of an elongated curved length of spring alloy steel or the like bent at opposite ends 20, 21 to provide a gripping portion in which U-shaped threaded bolts 100, may be disposed. The spaced legs of each bolt 100 are receivable in suitable apertures in brackets 24, 25, respectively, and retained thereto by nuts 26 threaded to the threaded ends of bolts 100.

As particular contemplated in the present invention, bolts 100 include offset portions spacing the same from conventional keepers 201' which are used to hold the leaves together of the multi-leaf spring 10.

Load assistance device 19 also includes a plurality, such as two, of curved elongated springs or members 27, 28 disposed between spring 29 and multi-leaf spring 10. Members 27, 28 are of varying lengths as shown.

Load assistance device 19 further includes each member 27, 28, 29 being curved at the middle to form a U-shaped raised portion between the preexisting spring member 11 and a short retaining bracket 30. A pair of threaded U-bolts 33, 34, couple bracket 30 to spring 10. U-bolts 33, 34 are retained to bracket 30 and spring 10 by having their legs receivable in plates 35, 36 secured by nuts 37 threaded to the legs of each U-bolt 33, 34. Thus, U-bolts 33, 34 and plates 35, 36 provide bracket means for securing the bracket 30, spring 27 to 29, 11, 14 and 15 together. As seen in FIG. 1, U-bolts 33, 34 are disposed in grooves 200, 201 formed in respective curved ends 202, 203 of bracket 30. U-bolts 33, 34 thus each are U-shaped bolts having spaced threaded legs integral with a bail portion as seen in application Ser. No. 09/083,752 now U.S. Pat. No. 5,992,831, issued Nov. 30, 1999. Curved member or spring 27 is a first spring abutting against the length or spring material 29 and is slightly less in overall length than the length of spring material 29. Curved member or spring 28 is a second spring abutting against spring 27 slightly less in overall length than spring 27.

A bracket 210 is disposed between leaves 14, 15, 16, 11 and the raised portion of members 27, 28, 29 secured by a suitable nut and bolt combination 38 (head not visible in FIG. 1) with U-bolts 211, 212 securing the entire device 19 to axle 220 (lower securing brackets and nuts for U-bolts 211, 212, not shown).

Referring now to FIGS. 2 and 3 of the drawing, as particularly contemplated in the present invention, bolts 100 of FIG. 1 are U-shaped in plan view (FIG. 2) having an upper bail portion 101 and an integral pair of spaced elongated legs 102, 103. Legs 102, 103 terminate in threaded ends 104, 105, respectively, adapted to receive threaded nuts 26 (FIG. 1) thereon.

As seen in FIG. 3, each leg 102, 103 has a first portion 106 integral with bail portion 101 and extending generally normal thereto, then angling downwardly, as at integral angled portion 107, then extending again generally normal to bail portion 101 forming an integral straight portion 108 terminating in integral threaded portion 105. Leg 102 is formed in like manner.

Any suitable dimensions may be used. For example, the spacing x between legs 102, 103 may be about 2.62 inches. Legs 102, 103 may be about 0.50 to 0.56 inches in diameter as may be the diameter of bail portion 101. Legs 102, 103 may be about 6.25 inches in overall length (that is, the linear distance y—FIG. 2—from where legs 102, 103 meet bail portion 101 to the terminal ends of threaded portions 104, 105). Threaded portions 104, 105 may be about 3.00 inches in length. The distance z may be about 1.80 inches and the distance a may be about 1 inch. Angle b may be about 143°. Radius R maybe about 0.25 to 0.50 inches and radius R' may be about 0.25 inches.

Thus, the offset distance of portion 106 to portion 108 is about 0.95 inches to 1.01 inches between the central longitudinal axes thereof.

In operation, bolts 100 are mounted as heretofore discussed providing clearance with the preexisting keepers 201.

It can be seen that a raised area is provided between the top of bracket 30 and the upper surface of spring 11. The curvature of bracket 30 conforms to the curvature of spring 29. The assembly of parts eliminates a number of parts in prior art devices, such as a step bracket, a spring plate, U-bolts, nuts, and washers. The upper plate or bracket 30 maintains the U-bolts 33, 34 in place so they do not move in or out.

The function and operation of the load assistance device 19 when attached to the preexisting multi-leaf spring of a vehicle is described in detail in my co-pending application Ser. No. 09/083,752, filed May 22, 1998, now U.S. Pat. No. 5,992,831 issued Nov. 30, 1999, the teachings of which are incorporated herein.

Although a specific embodiment of the invention is disclosed, variations thereof may occur to an artisan and the scope of the invention should only be limited by the scope of the appended claims.

I claim:

1. A load assistance device for increasing a vehicle's ability to carry loads by stabilizing a multi-leaf vehicle spring connected to an axle of a vehicle, said leaves of said multi-leaf vehicle spring being held together by keepers at appropriate ends thereof, comprising:

a unitary length of metallic spring material adapted to be connected directly to said multi-leaf vehicle spring at opposite ends thereof forwardly and rearwardly of an axle connection thereof, said length of spring material having a single raised area at generally the midpoint thereof spaced from an uppermost leaf of said vehicle spring when mounted thereto;

a plurality of springs of varying lengths mounted between said unitary length of spring material and said vehicle spring and configured similarly to said length of spring material, said plurality of springs also having a raised area conforming to the raised area of said length of spring material forming a space between the uppermost leaf of said vehicle spring and the lowermost one of said plurality of springs when coupled to said vehicle spring;

a bracket mounted on top of said unitary length of spring material at generally the center thereof spanning the raised area thereof and generally conforming to the configuration of said unitary length of spring material at its raised area; and bracket means encircling said bracket, said unitary length of spring material and said plurality of springs adapted to secure said bracket, said unitary length of spring material and said plurality of springs to said multi-leaf vehicle spring, said bracket means comprising a pair of U-shaped bolts each having a bail portion receivable in spaced grooves provided in said bracket and spaced threaded legs extending downwardly from said bail portion adapted to be secured to respective mounting plates disposed below said vehicle spring, each of said bolts having an upper portion including said bail portion and a lower portion comprising said legs, said upper portion being offset from said lower portion thereby spacing said upper portions from said keepers when said load assistance device is secured to said vehicle spring.

2. The load assistance device of claim 1 wherein said length of spring material is curved at opposite ends thereof adapted to receive said U-bolts therein for securing said device to said vehicle spring.

3. The load assistance device of claim 1 wherein said length of spring material and said plurality of springs are curved.

4. The load assistance device of claim 1 wherein said plurality of springs comprise a first spring abutting against said unitary length of spring material and a second spring abutting against said first spring.

5. The load assistance device of claim 1 wherein said bracket is curved at opposite ends thereof providing spaced grooves for receiving said bracket means therein.

6. The device of claim 5 wherein said U-shaped bolts have said bail portions receivable in the spaced grooves of said bracket and said spaced threaded legs being adapted to be secured to respective mounting plates disposed below said vehicle spring.

7. The device of claim 1 wherein said plurality of springs comprise a first spring abutting against said length of spring material slightly less in overall length than said length of spring material and a second spring abutting against said first spring slightly less in overall length than said first spring.

8. In a spring stabilizer system designed to stabilize a multi-leaf vehicle spring comprised of a plurality of abutting leaves of elongated springs of varying lengths having an uppermost leaf secured together by keepers at opposite ends thereof and mounted at generally the midpoint thereof to an axle of a vehicle, the system comprising:

a unitary length of a leaf of metallic spring material connected directly to the multiple-leaf vehicle spring at opposite ends thereof forwardly and rearwardly of an axle connection, said leaf of spring material having a single raised area at generally the midpoint thereof spaced from the uppermost leaf of said vehicle spring; and a plurality of springs of varying lengths mounted between said unitary length of spring material and said vehicle spring and configured similarly to said length of spring and said plurality of springs of said multi-leaf vehicle spring, bracket means comprising a pair of U-shaped bolts each having a bail portion and spaced threaded legs extending downwardly from said bail portion secured to respective mounting plates disposed below said vehicle spring for securing said spring material and said spring of varying lengths to said multi-leaf spring, each of said bolts having an upper portion including said bail portion and a lower portion including said legs, said upper portion being offset from said lower portion so that said upper portions of said U-shaped bolts are spaced from said keepers.

9. The system of claim 8 wherein said length of spring material is curved at opposite ends thereof adapted to receive U-bolts therein for securing said system to said vehicle spring.

10. The system of claim 9 wherein said length of spring material and said plurality of springs of varying lengths are curved.

11. The system of claim 9 including a bracket mounted on top of said unitary length of spring material spanning said raised area thereof and wherein said plurality of springs of varying lengths comprise a first spring abutting against said unitary length of spring material and a second spring abutting against said first spring.

12. The system of claim 9 including a bracket mounted on top of said unitary length of spring material spanning said raised area thereof and wherein said bracket is curved at opposite ends thereof providing spaced grooves adapted to receive said bracket means thereof.

13. The system of claim 12 wherein said bail portions are receivable in the spaced grooves of said bracket.

14. The device of claim 9 wherein said plurality of springs of varying lengths comprise a first spring abutting against said length of spring material slightly less in overall length than said length of spring material and a second spring abutting against said first spring slightly less in overall length than said first spring.

15. A kit for increasing the stabilizing effect of a preexisting vehicle multi-leaf spring mounted on an axle of a vehicle comprising:

a unitary length of metallic spring material having a single raised area at generally the midpoint thereof;

a plurality of springs of varying lengths configured similarly to said length of spring material and also having a raised area conforming to the raised area of said length of spring material; and an elongated bracket generally conforming to the configuration of said unitary length of spring material at its raised area adapted to secure said length of spring material to said vehicle multi-leaf spring with said plurality of springs disposed therebetween; and a pair of U-shaped bolts each having a bail portion and spaced threaded legs extending downwardly from said bail portion, each of said U-shaped bolts having an upper portion including said bail portion and a lower portion including said legs, said upper portion being offset from said lower portion, a pair of mounting plates and a plurality of threaded nuts.

16. The kit of claim 15 wherein said plurality of springs comprise a first spring slightly less in overall length than said length of spring material and a second spring slightly less in overall length than said first spring.

17. The kit of claim 15 wherein said length of spring material is curved at opposite ends thereof.

18. The kit of claim 15 wherein said length of spring material and said plurality of springs are curved.

19. The kit of claim 15 wherein said bracket is curved at opposite ends thereof providing spaced grooves therein.

20. A combination load assistance device and vehicle assembly wherein the device stabilizes a multi-leaf vehicle spring of a vehicle having an axle, wherein the vehicle spring is connected to said axle of the vehicle and wherein the leaves of said spring are held together by keepers, a unitary length of metallic spring material connected directly to the multi-leaf vehicle spring and not connected directly to the vehicle frame or axle at opposite ends thereof forwardly and rearwardly of the axis connection, said length of spring material having a raised area at generally the midpoint thereof spaced from the uppermost leaf of said vehicle spring;

a plurality of springs of varying lengths mounted between said unitary length of spring material and said vehicle spring and configured similarly to said length of spring material, said plurality of springs also having a raised area conforming to the raised area of said length of spring material forming a space between the uppermost leaf of said vehicle spring and the lowermost one of said plurality of springs when coupled to said vehicle spring;

a bracket mounted on top of said unitary length of spring material at generally the center thereof spanning the raised area thereof and generally conforming to the configuration of said unitary length of spring material at its raised area; and bracket means encircling said bracket, said unitary length of spring material and said plurality of springs securing said bracket, said unitary length of spring material and said plurality of springs to said multi-leaf vehicle spring, said bracket means including a pair of U-shaped bolts, each of said bolts including an upper portion including a bail portion and a lower portion including a pair spaced legs threaded at the bottom coupled to said bail portion, said upper portion being offset from said lower portion.

21. The assembly of claim 20 wherein said each of said bail portions are coupled to said legs by angled portions.

* * * * *